United States Patent
Droms et al.

(10) Patent No.: US 7,646,786 B2
(45) Date of Patent: Jan. 12, 2010

(54) NEIGHBOR DISCOVERY IN CABLE NETWORKS

(75) Inventors: Ralph Edward Droms, Westford, MA (US); Madhu Sudan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 433 days.

(21) Appl. No.: 11/026,641

(22) Filed: Dec. 30, 2004

(65) Prior Publication Data

US 2005/0265261 A1    Dec. 1, 2005

(51) Int. Cl.
*H04J 3/16* (2006.01)
(52) U.S. Cl. .................. 370/465; 725/114; 725/111
(58) Field of Classification Search .................. None
See application file for complete search history.

(56) References Cited

U.S. PATENT DOCUMENTS

| | | |
|---|---|---|
| 4,977,593 A | 12/1990 | Ballance |
| 5,153,763 A | 10/1992 | Pidgeon |
| 5,457,678 A | 10/1995 | Goeldner |
| 5,604,735 A | 2/1997 | Levinson et al. |
| 5,724,510 A * | 3/1998 | Arndt et al. ............ 709/220 |
| 5,784,597 A | 7/1998 | Chiu et al. |
| 5,805,602 A | 9/1998 | Cloutier et al. |
| 5,918,019 A | 6/1999 | Valencia |
| 5,931,954 A | 8/1999 | Hoshina et al. |
| 5,933,420 A | 8/1999 | Jaszewski et al. |
| 5,963,557 A | 10/1999 | Eng |
| 6,023,769 A | 2/2000 | Gonzalez |
| 6,078,595 A | 6/2000 | Jones et al. |
| 6,101,180 A | 8/2000 | Donahue et al. |
| 6,137,793 A | 10/2000 | Gorman et al. |
| 6,233,235 B1 | 5/2001 | Burke et al. |
| 6,233,246 B1 | 5/2001 | Hareski et al. |
| 6,275,990 B1 | 8/2001 | Dapper et al. |
| 6,381,214 B1 | 4/2002 | Prasad |
| 6,418,324 B1 | 7/2002 | Doviak et al. |
| 6,434,141 B1 | 8/2002 | Oz et al. |
| 6,438,123 B1 | 8/2002 | Chapman |
| 6,490,727 B1 | 12/2002 | Nazarathy et al. |
| 6,510,162 B1 | 1/2003 | Fijolek et al. |
| 6,516,345 B1 * | 2/2003 | Kracht .................. 709/220 |
| 6,546,017 B1 | 4/2003 | Khaunte |

(Continued)

FOREIGN PATENT DOCUMENTS

| | | |
|---|---|---|
| WO | 00/72509 | 11/2000 |
| WO | 0072509 | 11/2000 |
| WO | 2005117310 | 12/2005 |
| WO | 2005117358 | 12/2005 |

OTHER PUBLICATIONS

Postel, J., "User Datagram Protocol", RFC 768, Aug. 28, 1980, 3 pgs.
Postel, Jon, Editor, "DARPA Internet Program Protocol Specification", RFC 791, Sep. 1981, 45 pages.
Deering, S., "Host Extensions for IP Multicasting", RFC 1112, Aug. 1989.

(Continued)

*Primary Examiner*—Robert W Wilson
(74) *Attorney, Agent, or Firm*—Stolowitz Ford Cowger LLP

(57) ABSTRACT

A network device has a communications link to allow the device to communicate with customer devices and a processor. The processor is to receive neighbor discovery messages from requesting customer devices, examine the neighbor discovery messages to determine if the neighbor discovery message should be forwarded to other of the customer devices, and respond to the requesting customer devices.

20 Claims, 2 Drawing Sheets

U.S. PATENT DOCUMENTS

| | | |
|---|---|---|
| 6,556,591 B2 | 4/2003 | Bernath et al. |
| 6,640,248 B1 | 10/2003 | Jorgensen |
| 6,693,878 B1 | 2/2004 | Daruwalla et al. |
| 6,697,970 B1 | 2/2004 | Chisholm |
| 6,698,022 B1 | 2/2004 | Wu |
| 6,763,019 B2 | 7/2004 | Mehta et al. |
| 6,763,032 B1 | 7/2004 | Rabenko et al. |
| 6,771,606 B1 | 8/2004 | Kuan |
| 6,804,251 B1 | 10/2004 | Limb et al. |
| 6,819,682 B1 | 11/2004 | Rabenko et al. |
| 6,847,635 B1 | 1/2005 | Beser |
| 6,853,680 B1 | 2/2005 | Nikolich |
| 6,857,132 B1 | 2/2005 | Rakib et al. |
| 6,901,079 B1 | 5/2005 | Phadnis et al. |
| 6,950,399 B1 | 9/2005 | Bushmitch et al. |
| 6,959,042 B1 | 10/2005 | Liu et al. |
| 6,993,016 B1 | 1/2006 | Liva et al. |
| 6,993,353 B2 | 1/2006 | Desai et al. |
| 6,996,129 B2 | 2/2006 | Krause et al. |
| 7,006,500 B1 | 2/2006 | Pedersen et al. |
| 7,007,296 B2 | 2/2006 | Rakib et al. |
| 7,023,882 B2 | 4/2006 | Woodward, Jr. et al. |
| 7,039,049 B1 | 5/2006 | Akgun et al. |
| 7,065,779 B1 | 6/2006 | Crocker et al. |
| 7,067,734 B2 | 6/2006 | Abe et al. |
| 7,110,398 B2 | 9/2006 | Grand et al. |
| 7,113,484 B1 | 9/2006 | Chapman et al. |
| 7,116,643 B2 * | 10/2006 | Huang et al. ............. 370/255 |
| 7,117,526 B1 | 10/2006 | Short |
| 7,139,923 B1 | 11/2006 | Chapman et al. |
| 7,145,887 B1 | 12/2006 | Akgun et al. |
| 7,149,223 B2 | 12/2006 | Liva et al. |
| 7,161,945 B1 | 1/2007 | Cummings |
| 7,164,690 B2 | 1/2007 | Limb et al. |
| 7,197,052 B1 | 3/2007 | Crocker |
| 7,206,321 B1 | 4/2007 | Bansal et al. |
| 7,209,442 B1 | 4/2007 | Chapman |
| 7,269,159 B1 | 9/2007 | Lai |
| 7,290,046 B1 | 10/2007 | Kumar |
| 7,359,332 B2 | 4/2008 | Kolze et al. |
| 7,363,629 B2 | 4/2008 | Springer et al. |
| 2001/0010096 A1 | 7/2001 | Horton et al. |
| 2001/0055319 A1 | 12/2001 | Quigley et al. |
| 2001/0055469 A1 | 12/2001 | Shida et al. |
| 2002/0009974 A1 | 1/2002 | Kuwahara et al. |
| 2002/0010750 A1 | 1/2002 | Baretzki |
| 2002/0023174 A1 | 2/2002 | Garret et al. |
| 2002/0052927 A1 | 5/2002 | Park |
| 2002/0067721 A1 | 6/2002 | Kye |
| 2002/0073432 A1 | 6/2002 | Kolze |
| 2002/0073433 A1 | 6/2002 | Furuta et al. |
| 2002/0088003 A1 | 7/2002 | Salee |
| 2002/0093935 A1 | 7/2002 | Denney et al. |
| 2002/0093955 A1 | 7/2002 | Grand et al. |
| 2002/0131403 A1 | 9/2002 | Desai et al. |
| 2002/0131426 A1 | 9/2002 | Amit et al. |
| 2002/0133618 A1 | 9/2002 | Desai et al. |
| 2002/0136203 A1 | 9/2002 | Liva et al. |
| 2002/0141585 A1 | 10/2002 | Carr |
| 2002/0144284 A1 | 10/2002 | Burroughs et al. |
| 2002/0146010 A1 | 10/2002 | Shenoi et al. |
| 2002/0147978 A1 | 10/2002 | Dolgonos et al. |
| 2002/0154655 A1 | 10/2002 | Gummalla et al. |
| 2002/0161924 A1 | 10/2002 | Perrin et al. |
| 2002/0198967 A1 | 12/2002 | Iwanojko et al. |
| 2003/0014762 A1 | 1/2003 | Conover et al. |
| 2003/0058794 A1 | 3/2003 | Pantelias et al. |
| 2003/0061415 A1 | 3/2003 | Horton et al. |
| 2003/0066087 A1 | 4/2003 | Sawyer et al. |
| 2003/0067944 A1 | 4/2003 | Sala et al. |
| 2003/0101463 A1 | 5/2003 | Greene et al. |
| 2003/0140131 A1 | 7/2003 | Chandrashekhar et al. |
| 2003/0163341 A1 | 8/2003 | Banerjee et al. |
| 2003/0214943 A1 | 11/2003 | Engstrom et al. |
| 2003/0214982 A1 | 11/2003 | Lorek et al. |
| 2004/0039466 A1 | 2/2004 | Lilly et al. |
| 2004/0045037 A1 | 3/2004 | Cummings et al. |
| 2004/0073902 A1 | 4/2004 | Kao et al. |
| 2004/0101077 A1 | 5/2004 | Miller et al. |
| 2004/0105403 A1 | 6/2004 | Lin et al. |
| 2004/0105406 A1 | 6/2004 | Kayama et al. |
| 2004/0143593 A1 | 7/2004 | Le Maut et al. |
| 2004/0160945 A1 | 8/2004 | Dong et al. |
| 2004/0163129 A1 | 8/2004 | Chapman et al. |
| 2004/0181800 A1 | 9/2004 | Rakib et al. |
| 2004/0244043 A1 | 12/2004 | Lind et al. |
| 2004/0248530 A1 | 12/2004 | Rakib et al. |
| 2005/0018697 A1 | 1/2005 | Enns et al. |
| 2005/0122976 A1 | 6/2005 | Poli et al. |
| 2005/0138669 A1 | 6/2005 | Baran |
| 2005/0198684 A1 | 9/2005 | Stone et al. |
| 2005/0201399 A1 | 9/2005 | Woodward, Jr. et al. |
| 2005/0226257 A1 | 10/2005 | Mirzabegian et al. |
| 2005/0232294 A1 | 10/2005 | Quigley et al. |
| 2005/0259645 A1 * | 11/2005 | Chen et al. ............. 370/389 |
| 2005/0265261 A1 | 12/2005 | Droms et al. |
| 2005/0265309 A1 | 12/2005 | Parandekar |
| 2005/0265338 A1 | 12/2005 | Chapman et al. |
| 2005/0265376 A1 | 12/2005 | Chapman et al. |
| 2005/0265392 A1 | 12/2005 | Chapman et al. |
| 2005/0265394 A1 | 12/2005 | Chapman et al. |
| 2005/0265397 A1 | 12/2005 | Chapman et al. |
| 2005/0265398 A1 | 12/2005 | Chapman et al. |
| 2005/0289623 A1 | 12/2005 | Midani et al. |
| 2006/0002294 A1 | 1/2006 | Chapman et al. |
| 2006/0159100 A1 | 7/2006 | Droms et al. |
| 2006/0168612 A1 | 7/2006 | Chapman et al. |
| 2007/0274345 A1 | 11/2007 | Taylor et al. |
| 2008/0037545 A1 | 2/2008 | Lansing et al. |

OTHER PUBLICATIONS

Droms, R., "Dynamic Host Configuration Protocol", RFC 2131, Mar. 1997.

Townsley, W., et al., "Layer Two Tunneling Protocol "L2TP"", RFC 2661, Aug. 1999, 80 pages.

Cable Television Laboratories, Inc., "Data-Over-Cable Service Interface Specifications DOCSIS 2.0, Radio Frequency Specification", SP-RFIv2.0-I04-030730, 1999-2003, 512 pages.

Cable Television Laboratories, Inc., "Data-Over-Cable Service Interface Specifications DOCSIS 2.0, Radio Frequency Interface Specification", CM-SP-RFIv2.0-I08-050408, Annex C, pp. 339-390, Copyright 1999-2005.

Cable Television Laboratories, Inc., "Data-Over-Cable Service Interface Specifications DOCSIS 2.0, Radio Frequency Specification", CM-SP-RFIv2.0-I09-050812, 1999-2005, 534 pages.

Cable Television Laboratories, Inc., "DOCSIS® Set-top Gateway (DSG) Interface Specification" CM-SP-DSG-I02-040804, Copyright 2001-2004.

Cable Television Laboratories, Inc., "DOCSIS® Set-top Gateway (DSG) Interface Specification" CM-SP-DSG-I04-050408, Copyright 2001-2005.

Bhattacharyya, et al., "An Overview of Source-Specific Multicast (SSM)", RFC 3569, Jul. 2003.

Droms, R., et al., "Dynamic Host Configuration Protocol for IPv6 (DHCPv6)", RFC 3315, Jul. 2003.

Droms, R., "Stateless Dynamic Host Configuration Protocol (DHCP) Service for IPv6", RFC 3736, Apr. 2004.

Chapman, John T., "CMTS Remote PHY for a DOCSIS Network: DMPI Over IP Protocol Specification", RP-SP-DoIP-D1-040715B. doc. Cisco Systems, Inc., EDCS-387722, May 26, 2004.

Cisco Systems, Inc., DHCP and the DOCSIS Configuration File for Cable Modems (DOCSIS 1.0), Document ID: 10961, Sep. 16, 2004.

IEEE Standards, "802.16, IEEE Standard for Local and Metropolitan Area Networks, Part 16: Air Interface for Fixed Broadband Wireless Access Systems", IEEE Std. 802.16—2004, Oct. 1, 2004, 893 pages.
Cable Television Laboratories, Inc., "Data-Over-Cable Service Interface Secifications Modular CMTS", CM-SP-DEPI-WO3-050302, 49 pgs., Copyright 2005.
Ramakrishnan, Sangeeta, "Next Generation Edge—Realizing the vision of shared resources and bandwidth", SCTE Conference on Emerging Technologies, Jan. 11-13, 2005, 16 pgs.
Chapman, John T., "Remote PHY Technical White Paper Addendum," Downstream External PHY Interface Specification, Cisco Systems, Inc., EDCS-377253, Jan. 24, 2005.
Cisco Systems, Inc., "Downstream External PHY Interface Specification", SP-DEPI-W2-04110A.DOC, EDCS-408926, Jan. 25, 2005.
Lau, J., et al., "Layer Two Tunneling Protocol—Version 3 (L2TPv3)," RFC 3931, Mar. 2005, 94 pages.
Cable Television Laboratories, Inc., "DOCSIS Radio Frequency Interface Specification", CM-SP-RFIv2.0-I10-051209, 538 pgs., Dec. 9, 2005.
Madvinsky, et al., Don't Let Your Modem Be Cloned, Jun. 2000, pp. 1-7, Communications Technology.
Millet, Theft of Service-Inevitable?, Dec. 2005, pp. 1-4, Communications Technology.
ETSI, Data-Over-Cable Systems Part 2 Radio Frequency Interface Sepcifications, Jan. 2003, pp. 59-66, ES 201 488-2 V1.2.1.
Desai, et al., FastChannel: A Higher-Speed Cable Data Service, AT&T Labs-Research, pp. 1-13.
Adoba, et al., Extensible Authentication Protocol (EAP), RFC 3748, Jun. 2004, pp. 1-64, Standards Track.
ITU-T Telecommunication Standardization Sector of ITU, Series J: Cable Networks And Transmission Of Television, Sound Programme And Other Multimedia Signals, Interactive Systems For Digital Television Distribution, Recommendation J.122, Dec. 2002, 506 pages, International Telecommunication Union.
U.S. Appl. No. 11/131,766, May 17, 2005, Chapman et al.
U.S. Appl. No. 11/135,777, May 23, 2005, Chapman et al.
U.S. Appl. No. 11/137,606 May 24, 2005, Chapman et al.
Postel, Jon, Editor, "DARPA Internet Program Protocol Specification", RFC 791, Sep. 1981, 45 pages.
Thompson, et al. IPv6 Stateless Address Autoconfiguration, RFC 2462, Dec. 1998, pp. 1-24, Network Working Group.
Thompson, et al. IPv6 Stateless Address Autoconfiguration, RFC 4862, Sep. 2007, pp. 1-29, Network Working Group.
Ramakrishnan, Sangeeta, "Next Generation Edge—Realizing the vision of shared resources and bandwidth", date unknown, 16 pgs.
Chapman, John T., "CMTS Remote PHY for a DOCSIS Network: DMPI Over IP Protocol Specification", RP-SP-DoIP-D1-040715B.doc, Cisco Systems, Inc., EDCS-387722, May 26, 2004.
Postel, J., "User Datagram Protocol", RFC 768, Aug. 28, 1980, 3 pgs.
Postel, Jon, Editor, "DARPA Internet Program Protocol Specification", RFC 791, Sep. 1981, 45 pages.
Townsley, W., et al., "Layer Two Tunneling Protocol "L2TP"", RFC 2661, Aug. 1999, 80 pages.
Cable Television Laboratories, Inc., "Data-Over-Cable Service Interface Specifications DOCSIS 2.0, Radio Frequency Specification", SP-RFIv2.0-I04-030730, 1999-2003, 488 pages.
Cable Television Laboratories, Inc., "Data-Over-Cable Service Interface Specifications DOCSIS 2.0, Radio Frequency Interface Specification", CM-SP-RFIv2.0-I08-050408, Annex C, pp. 339-390, © 1999-2005.
Cable Television Laboratories, Inc., "Data-Over-Cable Service Interface Specifications DOCSIS 2.0, Radio Frequency Specification", CM-SP-RFIv2.0-I09-050812, 1999-2005, 534 pages.
IEEE Standards, "802.16, IEEE Standard for Local and Metropolitan Area Networks, Part 16: Air Interface for Fixed Broadband Wireless Access Systems", IEEE Std. 80216—2004, Oct. 1, 2004, 893 pages.
Cable Television Laboratories, Inc., "Data-Over-Cable Service Interface Specifications Modular CMTS", CM-SP-DEPI-W03-050302, 49 pgs., Copyright 2005.
Lau, J., et al., "Layer Two Tunneling Protocol—Version 3 (L2TPv3)," RFC 3931, Mar. 2005, 94 pages.

Adoba, et al. Extensible Authentication Protocol (EAP), RFC 3748, Jun. 2004, pp. 1-64, Standards Track.
ITU-T Telecommunications Standardization Sector of ITU, Series J: Cable Networks And Transmission of Television, Sound Programme and other Multimedia Signals, Interactive Systems for Digital Television Distribution, Recommendation J. 122, Dec. 2002, 506 pages, International Telecommunications Union.
Cable Television Laboratories, Inc., "DOCSIS Radio Frequency Interfaces Specification", CM-SP-RFIv2.0-I10-051209, 538 pgs., Dec. 9, 2005.
Madvinsky, et al, Don't Let Your Modem Be Cloned, Jun. 2000, pp. 1-7, Communications Technology.
Millet, Theft of Service-Inevitable?, Dec. 2005, pp. 1-4, Communications Technology.
ETSI, Data-Over-Cable Systems Part 2 Radio Frequency Interface Specifications, Jan. 2003, pp. 59-66, ES 201 488-2 V1.2.1.
Patrick, M.; RFC3046-DHCP Rely Agent Information Option; The Internet Society (2001) http://www.faqs.org/rfcs/rfc3046.html; Jan. 2001; 11 pages.
Cable Television Laboratories, Inc., Interim Specification, Data-Over-Cable Service Interface Specifications, Radio Frequency Specification, SP-RFIv1.1-I02-990731, Jul. 30, 1999, 353 pages.
Cable Television Laboratories, Inc., Interim Specification, Data-Over-Cable Service Interface Specifications, Radio Frequency Interface Specification, SP-RFIv1.1-I04-000407, Apr. 7, 2000, 376 pages.
3COM, High-Speed Cable Internet Solutions, http://www.3com.com/cablenow/pdf/7125dsht.pdf, Dec. 1999, 4 pages.
Phuc H. Tran, USPTO Office Action Paper No. 20080427, May 1, 2008, 10 pages.
U.S. Appl. No. 11/292,725, Bernstein et al., "Advanced Multicast Support for Cable", filed Dec. 1, 2005.
Hawa et al., "Quality of Service Scheduling in Cable and Broadband Wireless Access Systems," at http://www.ittc.ku.edu/publications/documents/Hawa2002_iwqos_paper.pdf, Apr. 22, 2002, all pages.
Cisco Systems, Inc., "Downstream External PHY Interface Specification", SP-DEPI-W2-041101A.DOC, EDCS-408926, Oct. 29, 2004, all pages.
Chapman, John T., "Remote PHY Technical White Paper Addendum," Downstream External PHY Interface Specification, Cisco Systems, Inc., EDCS-377253, Oct. 1, 2004, all pages.
Cable Television Laboratories, Inc., "DOCSIS® Set-top Gateway (DSG) Interface Specification" CM-SP-DSG-I02-040804, Aug. 4, 2004, all pages.
Cable Television Laboratories, Inc., "DOCSIS® Set-top Gateway (DSG) Interface Specification" CM-SP-DSG-I04-050408, Apr. 8, 2005, all pages.
Desai, et al., FastChannel: A Higher-Speed Cable Data Service, AT&T Labs-Research, pp. 1-13, Jan. 2002.
Deering, S., "Host Extensions for IP Multicasting", RFC 1112, Aug. 1989, all pages.
Droms, R., "Dynamic Host Configuration Protocol", RFC 2131, Mar. 1997, all pages.
Bhattacharyya, et al., "An Overview of Source-Specific Multicast (SSM)", RFC 3569, Jul. 2003, all pages.
Droms, R., et al., "Dynamic Host Configuration Protocol for IPv6 (DHCPv6)", RFC 3315, Jul. 2003, all pages.
Droms, R., "Stateless Dynamic Host Configuration Protocol (DHCP) Service for IPv6", RFC 3736, Apr. 2004, all pages.
Cisco Systems, Inc., DHCP and the DOCSIS Configuration File for Cable Modems (DOCSIS 1.0), Document ID: 10961, Sep. 16, 2004, all pages.
Data Over Cable Service Interface Specification, Aug. 4, 1997, all pages.
Ethereal: Display Filter Reference: DOCSIS Upstream Channel Descriptor, Webarchivedate Apr. 27, 2004, all pages.
DOCSIS Set Top Gateway (DSG) interface specification, Feb 28, 2002, all pages.
An Overview of Internet Protocols, Dann, Jan. 1998, all pages.

* cited by examiner

NEIGHBOR DISCOVERY IN CABLE NETWORKS

This application claims priority from U.S. Provisional Application Ser. Nos. 60/574,506 filed May 25, 2004; 60/574,876 filed May 26, 2004; 60/582,732 filed Jun. 22, 2004; 60/588,635 filed Jul. 16, 2004; and 60/590,509 filed Jul. 23, 2004.

BACKGROUND

Neighbor Discovery (ND) is a protocol currently being deployed in the Internet Protocol (IP) version 6, abbreviated here as IPv6. It is possible that subsequent versions of IP as well as other communications protocols may use similar protocols, all of which will be referred to here as neighbor discovery. The Neighbor Discovery protocol is specified in the Internet Engineering Task Force (IETF) Request for Comments (RFC) 2461, and concepts disclosed here, while discussed with regard to IPv6, may be applicable to other protocols.

Hosts, routers and other network devices using IPv6 use the Neighbor Discovery protocol messages for several purposes. A host may use neighbor discovery to identify the hardware address associated with an IP address, and perform duplicate address detection (DAD) when employing stateless address autoconfiguration. A host may use neighbor discovery to locate a network device such as a router. The network device will forward datagrams for the host. A network device such as a router may use neighbor discovery to identify itself to hosts on a link, and announce prefixes available on a link for hosts employing stateless address autoconfiguration. Datagrams, as that term is used here, are the 'bundles' of data employed to transmit data across the network, such as IP packets, Asynchronous Transfer Mode (ATM) cells, and Frame Relay (FR) frames.

Neighbor discovery messages are transmitted on a regular basis by both hosts and network devices. The neighbor discovery traffic on a link increases as the number of hosts on the link increases, and can represent a significant fraction of the total traffic on a link. Neighbor discovery messages are often sent to a multicast address, so that those messages are delivered to all of the hosts on a link and are individually processed by each host on a link.

When IPv6 is deployed by a service provider to customers over a cable medium, the network is often constructed so all of the "customer devices", or hosts, are connected to a single "network device", which forwards datagrams sent from customer devices. For example, customer premises equipment (CPE) devices (customer devices) are attached to the same cable modem termination system CMTS device (network device). The customer devices may be either cable modems (CMs) or home computers (PCs).

The upstream and downstream connectivity between the network device and the customer devices is asymmetric. In the downstream direction, from network device to customer device, the physical link is shared by all the customer devices. Hence they appear to be connected to the same link.

In the upstream direction, i.e., customer device to network device, the link is not shared; each device has its own unidirectional physical link to the network device. Hence, data sent by one device is not visible to the other devices. There are sometimes as many as 50,000 customer devices connected to a single network device. All of these devices generate neighbor discovery messages which are sent to various multicast addresses on the link, generating significant overhead on the link and causing significant processing overhead on the other customer devices receiving the neighbor discovery messages.

SUMMARY

One embodiment of the invention is a network device having a communications link to communicate with customer devices. The processor in the network device is to receive neighbor discovery messages from requesting customer devices, examine the neighbor discovery messages to determine if the neighbor discovery message should be forwarded to other of the customer devices, and respond to the requesting customer devices.

Another embodiment of the invention is a method of processing neighbor discovery messages. The method receives a neighbor discovery message from a requesting customer device. The neighbor discovery message is examined to determine if the neighbor discovery needs to be forwarded to any other customer devices. The requesting customer device is then responded to.

BRIEF DESCRIPTION OF THE DRAWINGS

Embodiments of the invention may be best understood by reading the disclosure with reference to the drawings, wherein.

DETAILED DESCRIPTION OF THE EMBODIMENTS

Figure 1:
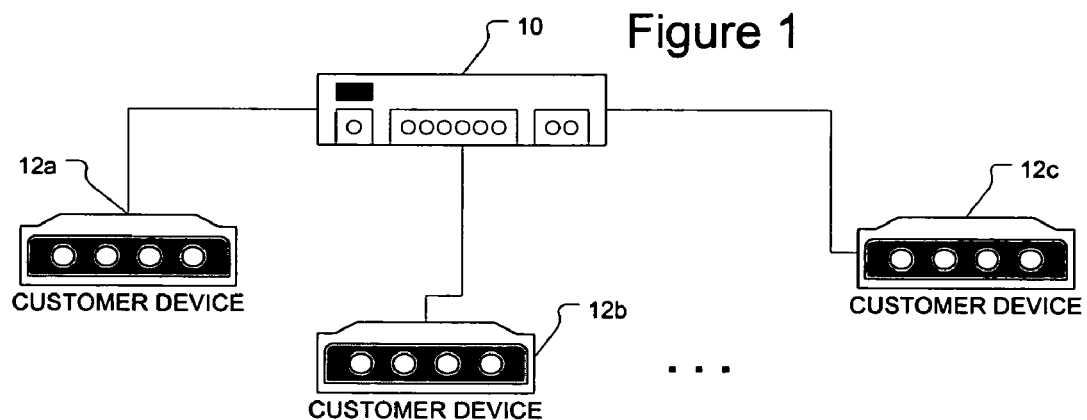
FIG. 1 shows an embodiment of a network device in communication with several customer devices.

An embodiment of a portion of a cable data network is shown in FIG. 1. The network device 10 serves as a connection between the customer devices 12a-12c and the network. The customer devices may be cable modems or home computers (PCs). As many as fifty thousand customer devices connected to a single network device.

As discussed previously, in a cable modem network deploying IPv6 with neighbor discovery, or similar discovery protocols, the messages will generate significant overhead on the link, and significant processing overhead on the customer and network devices. For example, when the customer device 12a initializes it sends a neighbor discovery message across its connection to the network device 10 to perform duplicate address detection (DAD). The DAD process allows a device to determine if its chosen address is duplicated in the system. If it is duplicated, there are mechanisms in the DAD process to allow for selection of a unique address. Currently, the network device relays this message to any other customer devices that are currently connected to the network device, such as cable modems 12b through 12c. Each customer device receives a copy of the message from the customer device 12a.

Similarly, a customer device may need to identify the Media Access Control (MAC) address associated with a network address. Generally, this occurs when a customer device such as 12a is sending a packet to the network address of another device such as 12c. The customer device 12a sends a neighbor discovery message to determine the MAC address of the device that is associated with that network address. This message currently gets relayed by the network device to all of the customer devices.

One possible solution would be to filter out the messages for other devices at each customer device. All of these messages require some level of processing by each customer device, contributing to the inefficiencies of the network. Filtering the messages at the device interface on the customer device would alleviate part of this problem. However, it is not possible to do this in cable modem networks.

In embodiments of this invention, the network device uses filtering and proxying to reduce the link traffic and processing overhead in a cable network. The network device receives all of the messages from the customer devices prior to relaying them out to the other customer devices. By altering the operation of the network device, it is possible to avoid sending out a bulk of the neighbor discovery messages to other customer devices.

Figure 2:
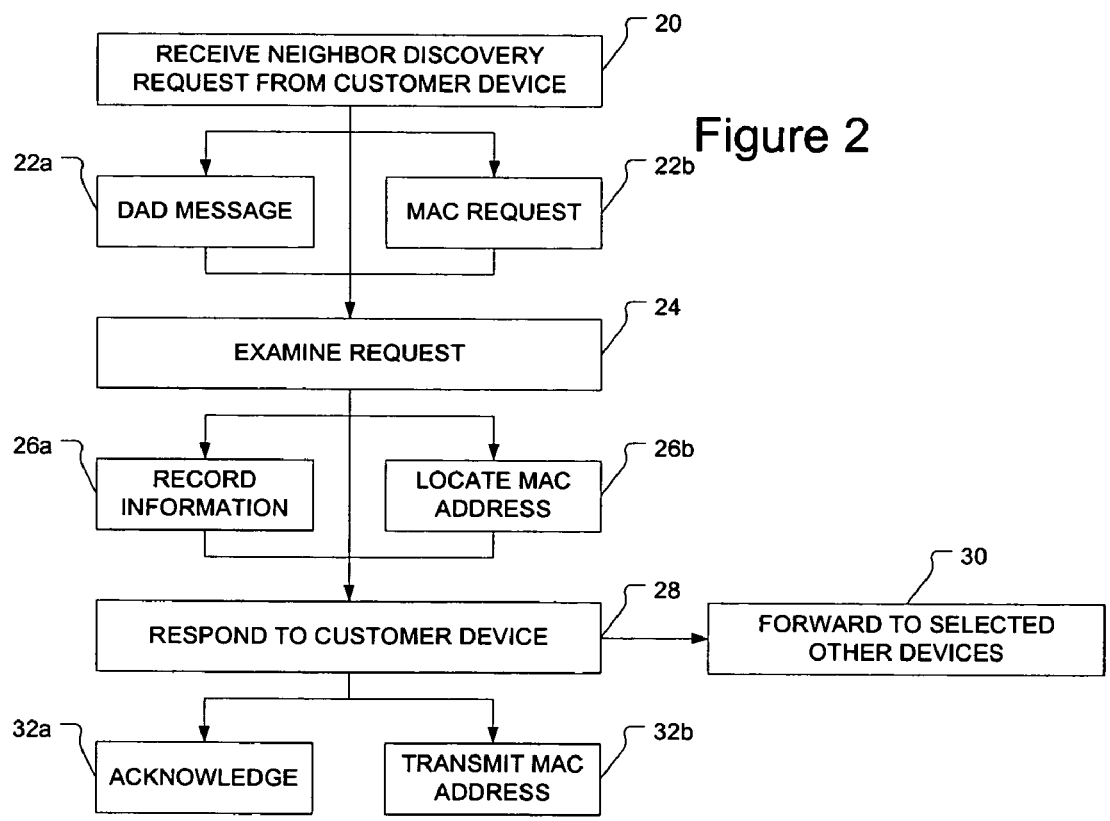
FIG. 2 shows a flowchart of an embodiment of a method to process neighbor discovery messages.

FIG. 2 shows an embodiment of a method to process neighbor discovery messages. At 20, the network device receives a neighbor discovery request from the customer device. Essentially, the network device intercepts the message. These messages may be DAD messages 22a, MAC address requests 22b, or other types of messages, such as multicast messages. These specific examples will be addressed at each part of the process to demonstrate principles of the invention.

At 24, the message is examined. The network device 'reads' the message and determines the appropriate action needed in response. For example, when the message is a DAD message from a customer device 12a performing initialization, the network device would intercept the message and examine it at 24. If the message is a DAD message, at 26a, the network device examines its list of customer device information. If the network address does not already appear in the list, the network device forwards the request to selected other devices in 30.

If there is no response, the network device adds the network address, such as an IPv6 address and MAC address for the customer device to its list of customer device information. If the address does appear in the list of customer device information, or some other device responds to DAD request forwarded by the network device, the network device then responds to the customer device at 28, in this example by sending an acknowledgement of the address at 32a. This process is repeated for each device as it initializes, adding its information to the list and responding directly to the device, rather than sending them out to all of the other customer devices.

For the example of the message being a MAC address request 26b, a similar process occurs. The network device intercepts the neighbor discovery from the requesting customer device. It then accesses its list of customer device information to determine the MAC address associated with a particular network address. If the address in the request appears in the list, the network device sends a response to the requesting CPE at 28 and does not forward the message to any of the other customer devices. In this example, the response includes the requested MAC address at 32b. If the address in the request does not appear in the list of customer device information, the network device forwards the request to other devices in 30. Any responses from other devices are returned to the customer device that sent the original request in 32b.

In some instances, there may be a need to send the neighbor discovery request to other devices. In those cases, the network device would intercept the message and determine which, if any, other customer devices need to receive the message. The neighbor discovery message would only be sent to relevant customer devices at 30, not to all devices connected to the network device, as currently happens.

Figure 3:
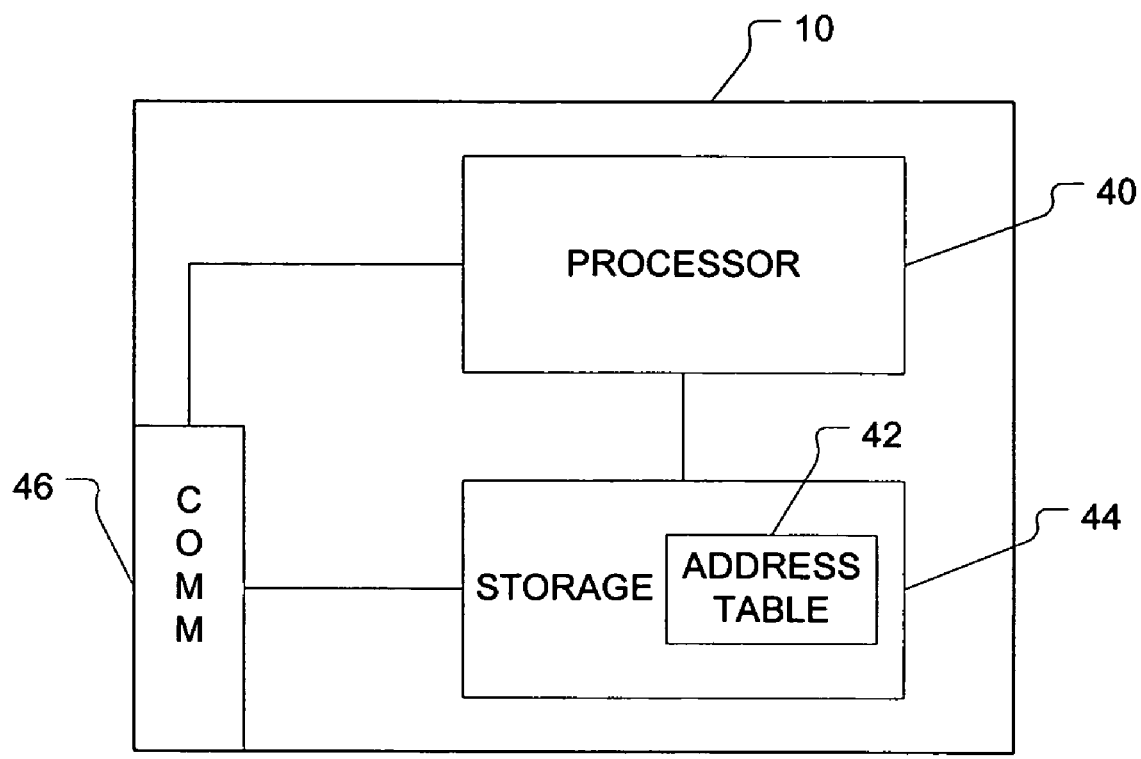
FIG. 3 shows an embodiment of a network device.

FIG. 3 shows an embodiment of network device 10 capable of functioning as a network device. The device has a communications link 46 to allow the device to communicate with customer devices. In a cable network, this communications link will generally be a cable link.

The device also has a processor 40 to receive neighbor discovery messages from requesting customer devices and to examine the neighbor discovery messages to determine if the neighbor discovery message should be forwarded to other of the customer devices. The processor also allows the device to respond to the requesting customer devices. The processor may be a general-purpose processor, a digital signal processor, etc., or any device that can process commands and perform the necessary operations of the network device device.

In addition, the device may have a local storage 44 that contains the list of customer device information 42. This information may take the form of a table that lists the MAC address of devices associated with the devices network addresses. The storage may also be located elsewhere in the system.

Generally, the embodiments of this invention can be implemented in a currently existing network device. The software or firmware used to operate the processor of the network device could be altered to cause the device to perform the methods of the invention. The alteration will generally involve loading instructions that reside on an article of machine-readable media to the processor memory. The instructions, when executed, will cause the machine to perform the processes of the invention. In this case, the machine is the network device 10, operating as a network device.

Thus, although there has been described to this point a particular embodiment for a method and apparatus for neighbor discovery in cable systems, it is not intended that such specific references be considered as limitations upon the scope of this invention except in-so-far as set forth in the following claims.

What is claimed is:

1. A system, comprising:
  a Cable Modem Termination System (CMTS) configured to operate between a data network and a cable network, the CMTS to communicate upstream traffic sent from a plurality of cable modems to the data network, to receive traffic from the data network for forwarding downstream to the cable modems, wherein the CMTS includes:
  a database containing addressing information for the cable modems;
  a communications link to allow the CMTS to communicate with the cable network; and
  circuitry configured to:
    receive a neighbor discovery message from a requesting one of the cable modems;
    identify an address corresponding to the received neighbor discovery message;
    compare the identified address to the database to determine whether the database includes a stored address corresponding to the identified address;
    forward the received neighbor discovery message if the corresponding stored address is absent from the database; and
    filter the received neighbor discovery message according to the comparison such that the neighbor discovery message is not forwarded to one of the other cable modems if the corresponding stored address is present in the database.

2. The system of claim 1, wherein the circuitry is further configured to send a reply back to the requesting one of the cable modems if the received discovery message is not forwarded, the reply providing the stored address to the requesting one of the cable modems.

3. The system of claim 1, wherein the circuitry is further configured to:
  extract a network address from the received neighbor discovery message;
  compare the extracted network address to the database; and forward the received neighbor discovery message only if the extracted network address is absent from the database.

4. The system of claim 1, wherein the circuitry is further configured to:
   identify a physical address corresponding to the received neighbor discovery request;
   compare the identified physical address to the database; and
   forward the received neighbor discovery message only if the identified physical address is absent from the database.

5. The system of claim 1, wherein the neighbor discovery message is sent to a destination selected by the requesting cable modem, and the selected destination is not the CMTS, and the circuitry is further configured to:
   intercept the neighbor discovery message; and
   identify, according to the comparison, at least one destination for forwarding the neighbor discovery message, the at least one identified destination being different than the selected destination.

6. The system of claim 1, wherein bandwidth in the cable network is preserved when the CMTS filters the received neighbor discovery message.

7. A method, comprising:
   examining a received neighbor discovery message using a Cable Modem Termination System (CMTS), the neighbor discovery message originating from one of a plurality of cable modems and formatted to be forwarded to one or more of the non-originating cable modems;
   identifying an address according to the examination using the CMTS, the address associated with information included in the neighbor discovery message;
   comparing, using the CMTS, the identified address to a database containing addressing information for the cable modems;
   filtering, using the CMTS, the neighbor discovery message according to the comparison, said filtering preventing the neighbor discovery message from being forwarded to the non-originating cable modems; and
   responding to the requesting customer device using the CMTS if said filtering is performed.

8. The method of claim 7, wherein the neighbor discovery message is received in accordance with Internet Protocol version 6.

9. The method of claim 7, wherein the neighbor discovery message is a duplicate address detection message and the method further comprises:
   identifying the address by extracting the address from the duplicate address detection message; and
   forwarding the duplicate address detection message if the extracted address is absent from the database.

10. The method of claim 7, wherein the neighbor discovery message is a media access control address request message and the method further comprises:
   filtering the media access control address request message and responding to the originating cable modem if the database includes a physical address corresponding to the identified address.

11. The method of claim 7, further comprising recording a network address and a media access control address for the originating cable modem.

12. The method of claim 7, wherein the database includes a list of network addresses and associated media access control addresses, and the method further comprises:
   identifying one of the media access control addresses associated with a network address provided in the neighbor discovery message.

13. The method of claim 7, further comprising sending back a reply to the neighbor discovery message if the database includes a stored address that corresponds to the identified address, the reply sent to only the originating cable modem.

14. The method of claim 7, further comprising sending back a reply to the neighbor discovery message if the database includes a stored address that corresponds to the identified address, the reply sent to the originating cable modem and selected other devices connected to the CMTS.

15. A cable modem termination system, comprising:
   means for allowing the cable modem termination system to communicate with cable modems; and
   means for:
      receiving and processing a message from an originating one of the cable modems, the message requesting an address determination;
      identifying an address according to the processing, the address associated with information included in the message;
      comparing the identified address to a list containing addressing information for the cable modems;
      determining whether the list includes a stored address corresponding to the identified address according to the comparison; and
      preventing the message from being forwarded according to the determination such that the message is not forwarded if the stored address is present in the list.

16. The cable modem termination system of claim 15, further comprising means for storing a table of network addresses associated with media access control addresses.

17. The cable modem termination system of claim 15, the means for receiving and processing, identifying, comparing, determining and preventing forwarding further comprising a digital signal processor.

18. An article of machine-readable media containing instructions that when executed by a machine performs:
   receiving and processing a message from an originating one of a plurality of cable modems, the message requesting an address determination;
   identifying an address according to the processing, the address associated with information included in the message;
   comparing the identified address to a list containing addressing information for the cable modems;
   determining whether the list includes a stored address corresponding to the identified address according to the comparison; and
   preventing the message from being forwarded to at least one network device according to the determination such that the message is not forwarded to the network device if the stored address is present in the list.

19. The article of machine-readable medium of claim 18, wherein the instructions, when executed, cause the machine to respond to only the originating cable modem if the message is prevented from being forwarded to the network device.

20. The article of machine-readable medium of claim 18, wherein the instructions, when executed, cause the machine to respond to the originating cable modem and selected other devices connected to the machine.

* * * * *

UNITED STATES PATENT AND TRADEMARK OFFICE
CERTIFICATE OF CORRECTION

PATENT NO. : 7,646,786 B2
APPLICATION NO. : 11/026641
DATED : January 12, 2010
INVENTOR(S) : Droms et al.

Page 1 of 1

It is certified that error appears in the above-identified patent and that said Letters Patent is hereby corrected as shown below:

Title Page item 60 - Please include Section (60) under Related U.S. Application Data to read:
--Provisional application No. 60/574,506, filed on May 25, 2004, provisional application No. 60/574,876, filed on May 26, 2004, provisional application No. 60/582,732, filed on Jun. 22, 2004, provisional application No. 60/588,635, filed on Jul. 16, 2004, provisional application No. 60/590,509, filed on Jul. 23, 2004.--

Signed and Sealed this

Ninth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,646,786 B2
APPLICATION NO. : 11/026641
DATED : January 12, 2010
INVENTOR(S) : Droms et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 743 days.

Signed and Sealed this

Twenty-eighth Day of December, 2010

David J. Kappos
*Director of the United States Patent and Trademark Office*